United States Patent [19]

Arnold

[11] 3,926,405
[45] Dec. 16, 1975

[54] SOLENOID OPERATED PROPORTIONAL VALVE
[75] Inventor: Kurt Arnold, West Caldwell, N.J.
[73] Assignee: Valcor Engineering Corporation, Kenilworth, N.J.
[22] Filed: Aug. 21, 1974
[21] Appl. No.: 499,202

[52] U.S. Cl.............................. 251/129; 251/141
[51] Int. Cl.².......................................... F16K 31/06
[58] Field of Search ............. 251/129, 138, 75, 141

[56] References Cited
UNITED STATES PATENTS
1,523,759  1/1925  Dougherty, Jr....................... 251/75
2,925,826  2/1960  Streeter ............................... 137/517
3,250,293  5/1966  Adams et al..................... 251/129 X
3,383,084  5/1968  Mayfield............................... 251/75

Primary Examiner—Arnold Rosenthal
Attorney, Agent, or Firm—Darby & Darby

[57] ABSTRACT

A valve having an armature for controlling the size of the valve opening, the position of the armature being controlled by the balancing of a variable magnetic field force against the spring force of a spring having a varying spring constant, such balancing producing a valve opening proportional to the variable magnetic field force.

11 Claims, 3 Drawing Figures

3,926,405

SOLENOID OPERATED PROPORTIONAL VALVE

BACKGROUND OF THE INVENTION

Solenoid operated valves normally use a spring-positioned armature to maintain the valve in a fixed position which may be either open or closed. Although the precise mechanisms that open or close the valve are complicated, essentially the solenoid current is increased until the solenoid's magnetic field exerts a force on the armature that exceeds the spring force exerted on the armature, thereby changing the valve from an open to a closed position or vice versa. As is well known, the magnetic force exerted on the armature by the solenoid is roughly proportional to $1/(gap)^2$ where gap is the distance between the armature and the solenoid. If, as is usually the case, the spring is a constant rate spring, the magnetic force increases more rapidly than the spring restoring force. Consequently, after initiation of armature movement, the armature continues to move until the gap distance is minimized.

This type of valve design has two significant drawbacks. After the armature begins to move, the magnetic force exceeds the spring restoring force, and consequently, the armature continues to move until its path is physically obstructed. Valves utilizing this design are useful only for on-off purposes as the armature may not be positioned between the opened and closed positions. Thus, the first drawback of this design is its limitation to on-off applications.

A second drawback of this design is its inefficiency. Although the magnetic and spring forces may be comparable when the armature stroke is initiated, the magnetic force is much larger than required at the end of the stroke. The amount by which the magnetic force exceeds the spring force results in increased solenoid power consumption that is not transformed into useful work. To maximize efficiency of the valve, it is therefore desirable to balance the spring and magnetic forces as closely as possible over as much of the armature stroke as practicable.

The valve herein described avoids these two drawbacks. In addition, it provides a means to effect a partial or proportional valve opening controlled by a variable solenoid current to move the armature to a correspondingly variable position intermediate the closed and opened valve positions. This is accomplished by arranging the armature such that it moves against a variable or multi-rate spring having a spring constant that increases as the armature moves toward the solenoid. The spring force thereby increases as rapidly (or more/less rapidly as required by the particular application) as the magnetic force as the armature moves toward the solenoid, such armature movement continuing until the magnetic force balances the spring force. Consequently, after initiation of armature movement, the armature continues to move until the gap distance is closed.

An object of the present invention is to provide a solenoid operated proportional valve.

A further object of the present invention is to provide a solenoid operated proportional valve utilizing an armature moving against a continuously varying multi-rate spring.

Yet another object of the present invention is to provide a solenoid operated proportional valve with variably balanced spring and magnetic forces over the armature stroke.

SUMMARY OF THE INVENTION

A valve using a solenoid activated armature whose position controls the fluid flow through the valve is described. The magnetic field produced by a controllable solenoid current moves the armature against a variable or multirate spring, e.g., the free end of a leaf spring cantilevered on a contoured surface. In the leaf spring arrangement, the surface contour is such that as the distance between the solenoid and the armature decreases and the magnetic force exerted on the armature increases, the effective length of the spring continuously decreases. As the effective length decreases, the spring constant increases and larger magnetic forces are necessary to produce equal deflections of the spring and armature. The surface contour and solenoid field are such that for a given armature position and spring length, the magnetic force exerted on the armature balances the spring force tending to restore it to its original or unflexed position. Since the magnetic force depends on the solenoid current, the current may be varied until the desired armature position and valve opening are obtained, thus permitting proportional opening of the valve.

The scope of the invention will be more fully apparent from consideration of the following description of a prefered embodiment of the invention described with reference to preferred accompanying drawings.

DESCRIPTION OF THE PREFERRED EMBODIMENT

Figure 1:
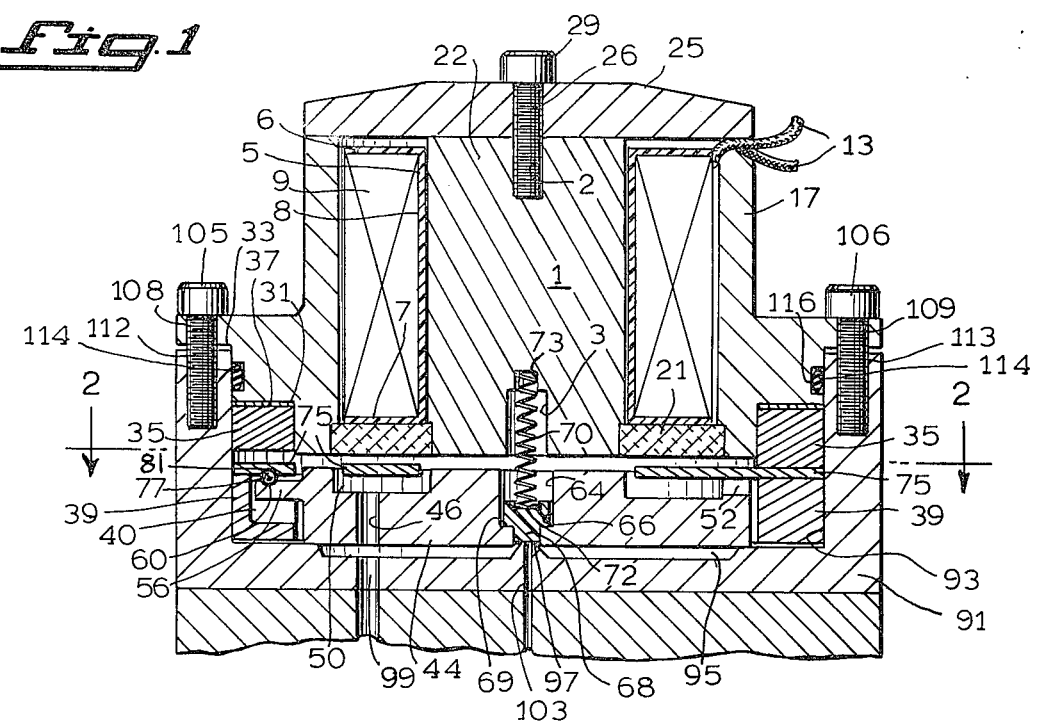
FIG. 1 is a vertical cross-sectional view of a valve in accordance with the present invention.
Figure 2:
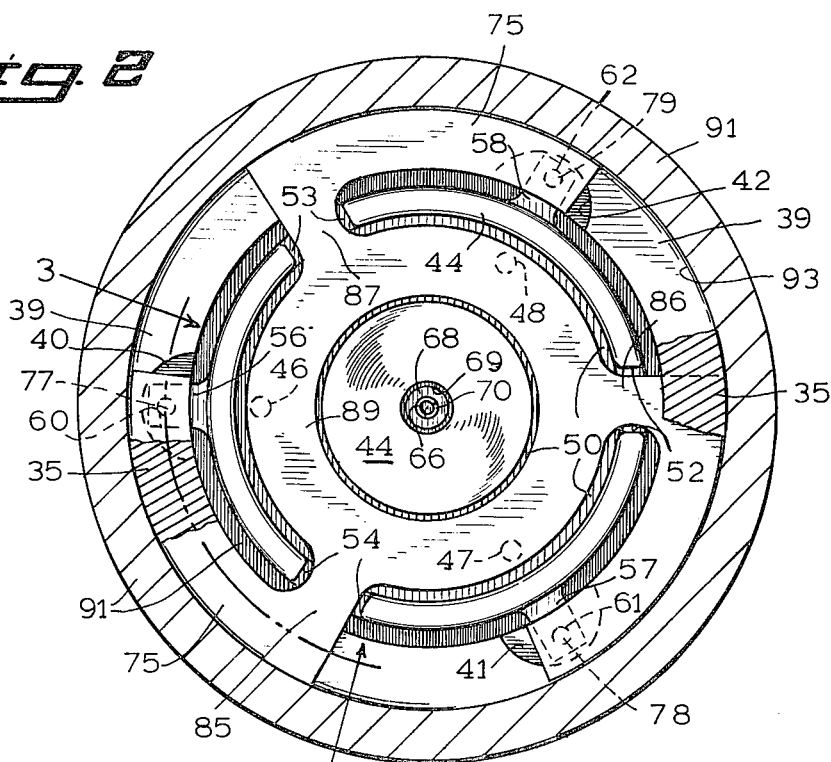
FIG. 2 is a horizontal cross-sectional view of the valve along the line 1—1 of FIG. 1.

The preferred embodiment of the valve is shown in vertical and horizontal cross-sections in FIGS. 1 and 2. The valve comprises a generally cylindrical stainless steel core 1 having a top bore 2 adapted to receive a screw and a bottom bore 3 fitted within cylindrical nylon bobbin 5. Both bores are positioned along the vertical axis of core 1. Bobbin 5 has a top flange 6 and a bottom flange 7 at the top and bottom of center wall 8, respectively, and extending horizontally outward from wall 8. The outer surface of core 1 has a circular shoulder 10 and bottom flange 7 positioned flush with shoulder 10. The solenoid winding 9 is wound in a generally circular manner around wall 8 and surrounded by a teflon impregnated fiberglass wrapping. Lead wires 13 are connected to any suitable electrical current source (not shown) and permit current to flow through winding 9 and produce a magnetic field that is generally cylindrically summetric about and directed along the vertical axis of bobbin 5.

Bobbin 5 and winding 9 are fitted within stainless steel shell 17 having a circular shoulder 18 positioned flush with bottom flange 7. The ring-shaped space beneath bobbin 5 and between core 1 and shell 17 is filled by non-magnetic spacer 21 which is pressed in and welded. The bottom surfaces are then machined until smooth. A stainless steel plate 25 has a hole 26 through which screw 29 is inserted in top bore 2 to hold plate 25 against the tops of core 1 and shell 17.

Figure 3:
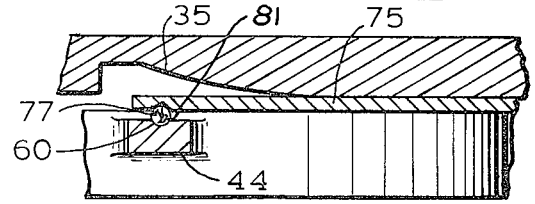
FIG. 3 is a cross-sectional view of the armature, leaf spring and contour surface along the line 3—3 of FIG. 2.

Shell 17 is provided with a downwardly deposed horizontal shoulder 31 for positioning a circular cam (Ref. FIGS. 1 and 3). Annular shim or shims 37 may be inserted between the top surface of cam 35 and lower surface of shoulder 31 to obtain the proper alignment between the bottom surfaces of shell 17 and cam 35 together with the desired geometry of cam 35 as described below.

There is also provided a ring 39 having the same inside and outside radii as cam 35 and which is positioned directly underneath. Three hollows 40, 41 and 42 are spaced in ring 39 at 120° intervals and extend partially from the inside and top toward the bottom and outside of the ring. Each hollow thereby forms a truncated segment of cylinder coaxial with ring 39.

Armature 44 is generally circular and made of stainless steel and placed within ring 39 in the same horizontal plane. Extending through armature 44 are three vertical holes 46, 47 and 48 spaced apart 120° and lying the same distance from the center of armature 44. The three holes terminate in annular groove 50 lying parallel to the plane of and extending downward from the uppermost surface of armature 44. Horizontal slots 52, 53 and 54 spaced apart 120° and having a vertical depth slightly less than that of groove 50 form passageways between groove 50 and the outer surface of armature 44. Extending horizontally outward from the vertical, outer surface and intermediate the top and bottom surfaces of armature 44 are lugs 56, 57 and 58 spaced apart 120°. The lugs are positioned equidistant from adjacent slots. The lugs are sized so as to be freely movable vertically within the hollows 40, 41 and 42. Each lug has a countersink 60, 61 and 62, respectively, on its upper surface.

Armature 44 has a large bore 64 extending from its top surface and communicating with small bore 66 whose radius is less than that of large bore 64 extending coaxially from the bottom surface. The lower portion of poppet 68 fits in small bore 66 leaving an opening, typically .005 inch, between small bore 66 and poppet 68. Poppet shoulder 69 is machined to provide a gap, typically .001 inch, between the shoulder 69 and armature 44 which permits dead travel. The upper portion of poppet 68 has, typically, a .01 gap between itself and large bore 64. Poppet 68 is made from polymide.

Leaf spring 75 is mounted on cam 35 so as to be positioned between the upper surface of ring 39 and the bottom surface of cam 35. In the embodiment illustrated, leaf spring 75 has three elements interconnected by arms 85, 86 and 87 spaced apart 120° and extending inwardly from one end of each element and terminating in center ring 89 which is smaller than groove 50. Leaf spring 75 is sized and oriented such that center ring 89 is over annular groove 50 and the arms pass through the horizontal slots 52, 53 and 54. The ends adjacent the arms are held in position by cam 35 and ring 39. Each element of leaf spring 75 has lateral dimensions equal to those of cam 35 and is positioned directly under a vertically varying cam andextends along the arc of a circle for approximately 66°. Lugs 56, 57 and 58 and the free ends of spring 75 are spaced apart by three balls 77, 78 and 79 placed between countersinks 60, 61 and 62 in the lugs and corresponding countersinks 81, 82 and 83 on the bottom surface of leaf spring 75. While each element of leaf spring 75 could be positioned individually, the construction described facilitates accurate placement of the elements.

Body or lower housing 91 is generally cylindrical with a vertical central bore 93 having a radius equal to the outer radii of cam 35 and ring 39. Cam 35 and ring 39 fit within central bore 93 with ring 39 positioned on the bottom of central bore 93. A helical biasing spring 70 having one end against the upper surface of bottom bore 3 and the other end against poppet 68 maintains armature 44 in its open or fixed position touching the bottom of central bore 93. In the embodiment described, when the armature is in its open position the valve is closed. To better maintain spring 70 in position, if it has a radius less than that of the bores in which its ends are placed, poppet 68 and bottom bore 3 have recesses 72 and 73, respectively, with radii adapted to receive the ends of spring 70. Within the circle formed by the points of contact between armature 44 and body 91 is annular depression 95 formed on the bottom surface of central bore 93. In the center is valve seat 97 which has a flat top that touches the bottom of poppet 68 when armature 44 is in its open or fixed position. Body 91 has a vertical inlet bore 99. Armature 44 and body 91 are oriented with respect to each other so that hole 46 is directly over inlet bore 99. It should be understood that more than one inlet bore could be used and that the inlet bores need not be directly under the holes in the armature. In the center of and extending through valve seat 97 is outlet bore 103.

Body 91 and upper housing 22 are fastened to each other to form the valve housing by a plurality of screws 105 and 106 which pass through holes 108 and 109 in shell 17 into corresponding bores 112 and 113 in body 91. Leakage of fluid along the interface of body 91 and shell 17 is prevented by O-ring 114 placed in horizontal O-ring groove 116 in the vertical outer surface of sheell 17 between lower shoulder 31 and upper shoulder 33.

The interior space between body 91 and upper housing 22 forms a chamber 118 in which armature 44 may move vertically. When the armature is in its lower position (as shown in FIG. 1), the poppet 68 insures that no fluid leaks through outlet bore 103. The uppermost or full open position is determined by the top surface of chamber 118.

FIG. 3 shows a cross-sectional view of armature 44, one element of leaf spring 75 and cam surface 35 along the line 3—3 of FIG. 2. There are three identical elements to the cam surface, although only one is depicted, spaced equally from each other around a horizontal circle centered on the vertical axis of the valve housing. The cam surface rises along each element of spring 75, beginning at the fixed ends of spring 75, away from the unflexed position of leaf spring 75 for approximately 50° along the arc of a circle concentric with the leaf spring 75 until it is over the end of an element of spring 75 and flush with the bottom surface of upper housing 22. It then returns to its initial value. The rise of the cam surface is non-linear so as to compensate for the increased magnetic force at the gap.

For small deflections of long thin beams such as the elements described of spring 75, the deflection of the spring is proportional to $Fl^3$ where F is the force exerted on the spring and l is the spring length. Therefore, if the effective spring length is decreased, a larger force is necessary to produce a deflection equal in magnitude to that produced by a smallerr force acting on a longer spring. The cam is designed so that the spring length shortens as the armature rises against the spring and increasingly larger forces become necessary to produce equal increments of armature movement as it rises due to the continuously increasing spring constant of leaf spring 75.

In FIG. 1, the solenoid is deenergized and the armature 44 is maintained in its fixed or, in this embodiment, open position by biasing spring 70. Poppet 68 closes outlet bore 103. The fluid pressures on the top and bottom surfaces of armature 44 are equal as the fluid can flow through holes 46, 47 and 48 and equalize the fluid pressure on the two surfaces. This is desirable as biasing spring 70 then does not have to withstand the upstream fluid pressure to maintain armature 44 in its fixed position. Consequently, spring 70 may have a smaller spring constant than it would need absent the holes and armature 44 may move primarily against leaf spring 75 if its spring constant is suitably chosen.

When solenoid winding 9 is activated, the solenoid's magnetic field exerts an upward force on the armature that is roughly proportional to $1/(gap)^2$ where gap is the distance between the core and the armature. Movement begins when the magnetic force exceeds the force of the biasing spring as the leaf spring is initially unflexed. In the embodiment illustrated, armature 44 moves against both springs 70 and 75 and the force tending to restore armature 44 to its closed position is the sum of the two spring forces. The use of several elements in spring 75 helps insure that armature 44 maintains the horizontal position as it moves vertically. Biasing spring 70 is a constant rate spring and as a result, if the value is to operate as a proportional valve, the armature must move primarily against the leaf spring after initiation of armature movement as the spring force and magnetic force must increase at the same rate. This matched rate of increase is possible because as the armature moves, the contact point of the free ends of the leaf spring moves on the cam surface and the effective length of the spring decreases and larger forces become necessary to produce equal deflections of the leaf spring and armature. Consequently the restoring force of the leaf spring should exceed that of the biasing spring over the desired range of armature positions. This also maximizes the solenoid efficiency as the armature moves primarily against the leaf spring and the leaf spring force closely matches the magnetic force over the armature stroke which is not true of the biasing spring force.

After energization of the solenoid with a current large enough to initiate movement, the resulting magnetic field moves armature 44 toward the solenoid and against leaf spring 75 (biasing spring 70 being weaker and disregarded) until a point is reached at which the magnetic force balances the spring force tending to restore the armature 44 to its original or open position. With proper design of the cam surface and of the magnetic field as a function of the solenoid current, the armature movement may be proportioned to the solenoid current. The contour must be such that the effective length of the spring decreases as the magnetic force increases. The actual shape of the surface may vary depending upon the variation of the solenoid field so that the armature movement varies with the solenoid current.

The fluid movement through the valve is regulated by the armature position as the amount of fluid passing through outlet bore 103 depends upon the armature position. The valve is thus not an on-off valve but rather the fluid flow may be continuously varied, from 0 to a maximum value obtained when the armature is in its uppermost position, by varying the solenoid current.

Balls 77, 78 and 79 serve two purposes. They permit the armature to exert a force on leaf spring 75 without directly touching spring 75 and damaging it as the armature moves. They also permit the point of contact of the armature and leaf spring to move as the armature moves without frictional losses.

The embodiment described uses magnetic means to move an armature, from a normally open position with the solenoid off and the valve closed, against a multirate spring having an increasing spring constant as the valve opens. The invention also encompasses an embodiment in which magnetic means move an armature, from an open position with the solenoid off and the valve open, against a multirate spring having an increasing spring constant as the valve closes. The latter embodiment could be achieved with a different position of the outlet bore.

Although a preferred embodiment of the invention has been described, it is not to be understood that this disclosure is for the purposes of illustration only and certain modifications may be obvious to those skilled in the art. For example, a leaf spring with four elements might be used. As as result, the scope of the invention is to be determined by the following claims.

What is claimed is:

1. In a solenoid activated proportional valve having an inlet, outlet and valve means movable between an open and closed position for controlling flow of a medium from the inlet through the outlet, the improvement comprising:
   electromagnetic force means acting on said valve means to move said valve means between said open and closed positions;
   spring force means also acting on said valve means and biased against the electromagnetic force means acting on said valve means; and
   means varying the spring constant of said spring means in response to the movement of said valve means, whereby the spring force opposing the electromagnetic force varies dependent on the position of said valve means, such forces being balanced when said valve means is in its open position.

2. In a solenoid activated proportional valve having an inlet, outlet and valve means movable between an open and closed position for controlling flow of a medium from the inlet through the outlet, the improvement comprising:
   electromagnetic force means acting on said valve means to move said valve means between said open and closed positions;
   spring force means also acting on said valve means and biased against the electromagnetic force means acting on said valve means; and
   means varying the spring constant of said spring means in response to the movement of said valve means, whereby the spring force opposing the electromagnetic force varies dependent on the position of said valve means, such forces being balanced when said valve means is in its open position;
   wherein said means for varying said spring constant comprises:
   a leaf spring;
   a cam surface; and
   mounting means for varying the length of the leaf in response to deflection.

3. A solenoid activated proportional valve as recited in claim 2, wherein said mounting means comprises a cantilever mounting.

4. A solenoid activated proportional valve as recited in claim 1, wherein said electromagnetic force means comprises:
a solenoid acting on said valve means, and
means for varying the current to the solenoid whereby the open position of the valve means may be varied.

5. A solenoid activated proportional valve as recited in claim 2, wherein said leaf spring is an articulated leaf spring, said cam surface is curved, said leaf spring is mounted on said cam surface whereby the effective length of said leaf is varied.

6. A solenoid activated proportional valve as recited in claim 5 further comprising:
ball contacts between said leaf spring and said valve means.

7. A solenoid activated proportional valve as recited in claim 2 further comprising:
a helical spring, said helical spring biasing said valve means when said solenoid is deenergized.

8. In a solenoid activated proportional valve having an inlet, outlet and a valve element movable between an open and closed position for controlling flow of a medium from the inlet through the outlet, the improvement comprising:
movable armature means acting on said valve element to move said element between said open and closed position;
electromagnetic force means acting on said armature means to move said means and thereby said valve element between said open and closed position;
spring force means also acting on said valve element and biased against the electromagnetic force acting on said armature means; and
means varying the spring constant of said spring means in response to the movement of said armature means, whereby the spring force opposing the electromagnetic force varies dependent on the position of said armature means.

9. In a solenoid activated proportional valve having an inlet, outlet and a valve element movable between an open and closed position for controlling flow of a medium from the inlet through the outlet, the improvement comprising:
movable armature means acting on said valve element to move said element between said open and closed position;
electromagnetic force means acting on said armature means to move said means and thereby said valve element between said open and closed position;
spring force means also acting on said valve element and biased against the electromagnetic force acting on said armature means; and
means varying the spring constant of said spring means in response to the movement of said armature means, whereby the spring force opposing the electromagnetic force varies dependent on the position of said armature means, said force means being balanced when said valve element is in its open position;
wherein said means for varying said spring constant comprises:
a leaf spring;
a curved cam surface;
cantilever mounting means for varying the length of the leaf in response to deflection.

10. A solenoid activated proportional valve as recited in claim 9, wherein said electromagnetic force means comprises:
a solenoid acting on said armature means, and
means for varying the current to the solenoid whereby the open position of the valve means may be varied.

11. A solenoid activated proportional valve as recited in claim 9 further comprising:
ball contacts between said leaf spring and said valve means.

* * * * *